Sept. 2, 1952 H. HACKLANDER 2,609,481
APPARATUS FOR SEALING DIELECTRIC MATERIALS
Filed Sept. 24, 1949 4 Sheets-Sheet 1

Witness:
Godfrey Pecina

Inventor
Hans Hacklander
By William P. Stewart Attorney

Sept. 2, 1952   H. HACKLANDER   2,609,481
APPARATUS FOR SEALING DIELECTRIC MATERIALS
Filed Sept. 24, 1949   4 Sheets-Sheet 3

Inventor
Hans Hacklander
By
William P. Stewart
Attorney

Witness:
Godfrey Pecina

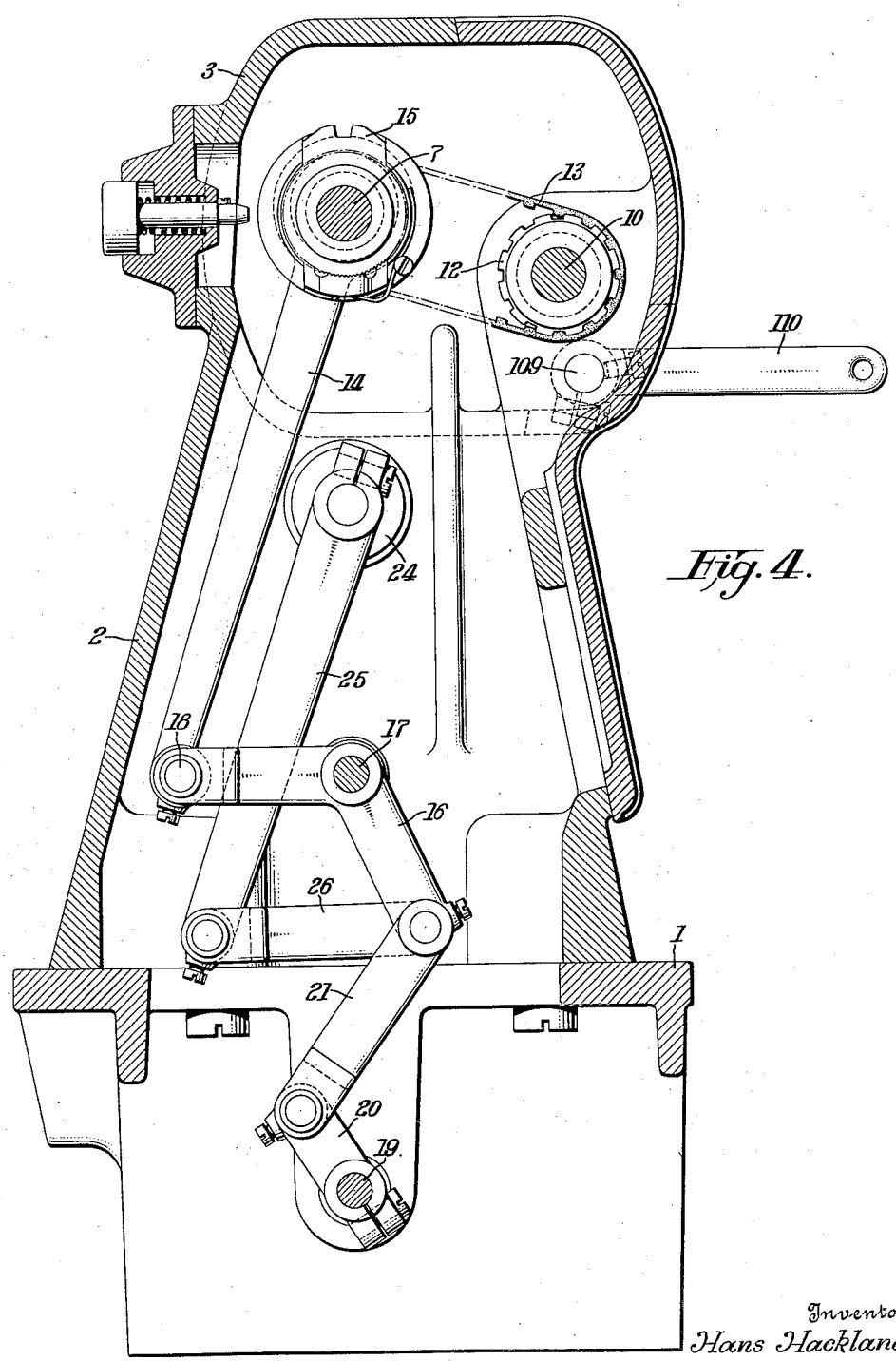

Patented Sept. 2, 1952

2,609,481

UNITED STATES PATENT OFFICE 2,609,481

APPARATUS FOR SEALING DIELECTRIC MATERIALS

Hans Hacklander, Linden, N. J., assignor to The Singer Manufacturing Company, Elizabeth, N. J., a corporation of New Jersey Application September 24, 1949, Serial No. 117,680

7 Claims. (Cl. 219—47)

This invention relates to apparatus for sealing dielectric materials and more particularly for continuously sealing together plies of thermoplastic materials by the application thereto of a radio-frequency electric field.

Heretofore, it has been customary to employ feed wheels in the line of seam or to one side of the line of seam for feeding the material past the electrodes. In the former case, the material in the line of seam being rendered soft by the action of the field, does not present a satisfactory area to which to apply traction, and erratic feeding results. In the latter case, the bonding electrode is separate from the feed wheel, and, although the traction is applied to an area not softened by the field, it is difficult to feed the top and bottom plies evenly especially when thick material is used.

To overcome these difficulties, it is proposed according to the invention, to employ a clamp feed system in which the work is seized equally on both sides of the line of seam and is positively carried forward intermittently, the bonding occurring in the intervals during which the clamp returns to its initial position to begin the next feeding stroke.

It has been found important in bonding materials of varying thickness to apply the radio-frequency field in pulses of time length proportional to the thickness. This is pointed out and described in the U. S. patent application Serial No. 47,356 of H. Hacklander et al., filed September 2, 1948, to which further reference may be had for a more complete discussion of this problem. One difficulty with the structure set forth therein resides in the fact that the bonding electrode must begin its rise away from the material before the switch can be operated to turn off the radio frequency energy to the electrode. Thus it may occur, especially with the extrusion normal to bonded thermoplastic materials, that the electrode rises out of the material with the radio frequency voltage still applied to the electrodes. This may cause severe sparking and damage to the surface of the material.

To overcome this difficulty, it is proposed, according to the present invention, to operate the switch which turns the oscillator on and off, by means separate from that which provides lift for the electrode, and further to provide adjustment for said means to allow the switch operation to be variably timed relative to the electrode position, so that the switch may be opened before the electrode begins its upstroke.

It is, therefore, a primary object of this invention to provide a machine for continuously welding thermoplastic sheets, in which machine the feeding is accomplished by intermittently applying traction to areas lying symmetrically on both sides of the line of seam.

It is a further object of this invention to provide a machine for making a continuously welded seam in thermoplastic material by intermittently applying a radio-frequency field to said material, in which machine there are independent adjustments for selecting the time of application of said field to and the removal of said field from the material relative to the respective application of pressure to and the removal of pressure from said material.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawings, Fig. 1 is a longitudinal section, partly in elevation, taken lengthwise through a machine embodying the invention.

Fig. 4 is a vertical section, partly in elevation, taken on line 4—4 of Fig. 1.

Fig. 6 is a vertical section, partly in elevation, taken on line 6—6 of Fig. 2.

Fig. 7 is a vertical section, partly in elevation, taken on line 7—7 of Fig. 2.

Fig. 8 is a horizontal section, taken on line 8—8 of Fig. 2.

Figure 1:
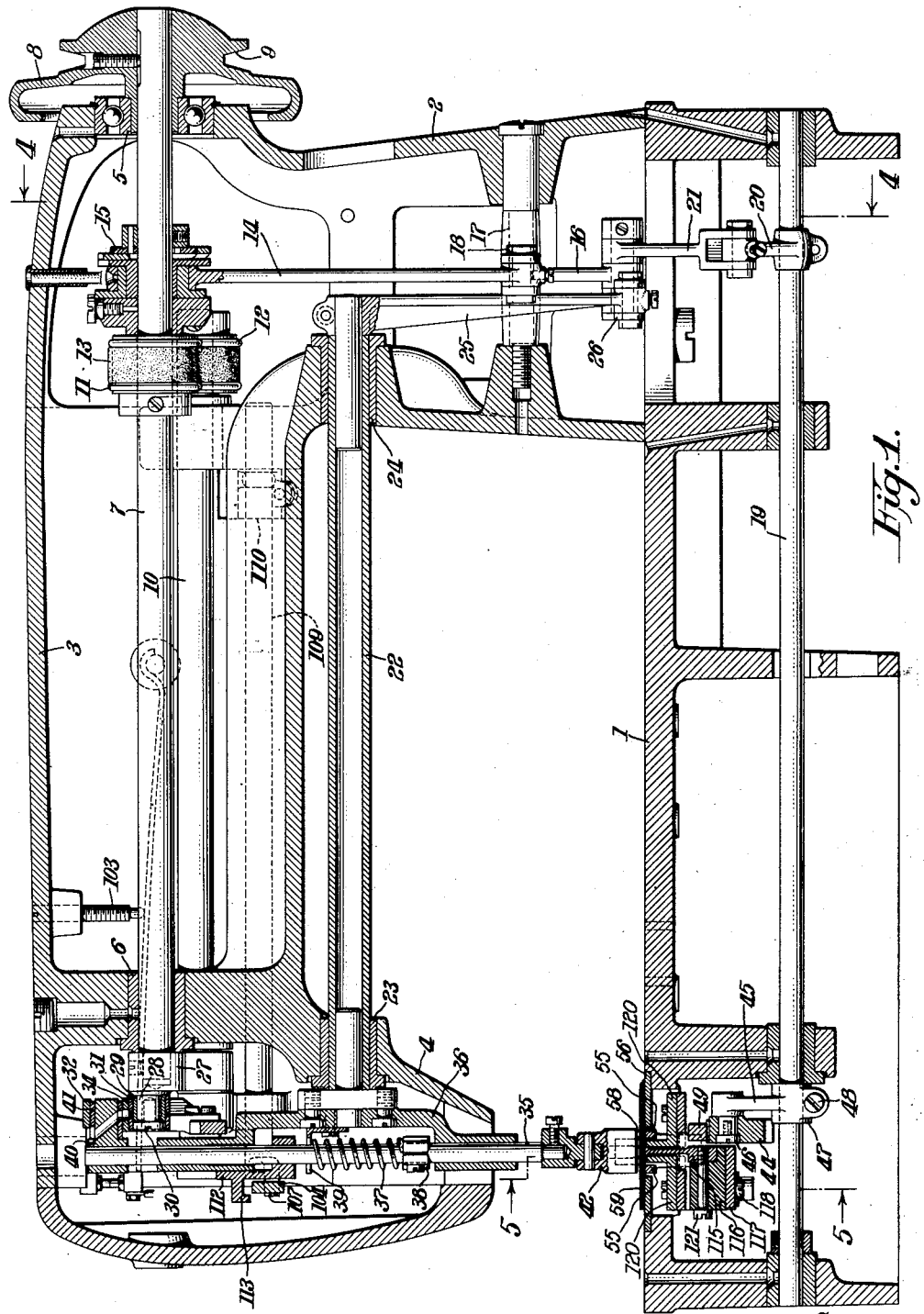

Referring to Fig. 1, a machine is shown, comprising a bed 1, from which rises an upstanding hollow standard 2 having an overhanging arm 3 terminating in a head 4. Journaled in bearings 5 and 6 in the overhanging arm 3 is an arm-shaft 7, to one end of which is affixed a drive pulley 8 formed with a groove 9 for receiving a belt for connection to a driving source (not shown).

Also journaled in bearings in the overhanging arm 3 is a countershaft 10 positioned in parallel relation to the arm-shaft 7 and positively driven therefrom by means of peripherally grooved pulleys 11 and 12 and mating belt 13 as shown most clearly in Fig. 4. The pulleys 11 and 12 being of the same diameter, the shafts 7 and 10 operate at the same rotational speed.

A pitman 14 is connected at one end to the armshaft 7 through an adjustable eccentric 15 and thus endwise movement is imparted to said pitman upon rotation of said shaft. The adjustable eccentric 15 is fully shown and described in the U. S. Patent No. 2,161,579 of R. Kaier, dated June 6, 1939, and reference may be had thereto for a more complete description thereof.

As illustrated in Figs. 1 and 4, a bell-crank lever 16 is pivoted on a stud 17 secured in the upstanding standard 2. Oscillating movement is imparted to said bell-crank lever by connection with the pitman 14 at 18.

A rock-shaft 19, journaled in bearings in the bed 1 is connected by a crank-arm 20 and a link 21 to said bell-crank lever 16, from which connection a to-and-fro oscillating motion is imparted to said shaft 19.

A shaft 22, which extends externally beneath the overhanging arm 3, is journaled in bearings 23 and 24, respectively, in the head 4 and standard 2, and is connected to said bell-crank lever 16 by a crank-arm 25 and link 26, whereby a rotary oscillating motion is imparted to said shaft 22.

Thus, the four shafts 7, 10, 19 and 22 are positively linked together, and one complete revolution of the arm-shaft 7 results in a complete revolution of the countershaft 10, and one complete cycle of operation of each of the shafts 19 and 22, which fixed relation is important in properly correlating the four functions of feeding, application of pressure, sensing of thickness, and application of the electric field, as will be explained presently.

Secured to one end of the shaft 7 is a disc 27 carrying an eccentric pin 28 on which is mounted a roller bushing 29 retained thereon by a cap screw 30. Surrounding said roller bushing 29, and suitably secured thereto, is a wear collar 31.

A fork 32, pivoted at 33, has its lower limb 34 in contact with the collar 31, and rising and falling movements are imparted to it by rotation of the shaft 7.

A feed bar 35 is journaled for vertical reciprocation in a frame 36 secured to one end of the shaft 22, which thus imparts to the frame and hence to the feed bar a swinging motion. A compression spring 37 embraces the feed bar 35 and is held between an adjustable stop 38 secured to the bar 35 and a bracket 39 secured to the frame 36. This provides a downward biasing force to the bar 35, against which force the bar is lifted by means now to be described.

Secured to the upper end of the feed bar 35 is a stud 40 over which is fitted a wear bushing 41, the whole being embraced by the pivoted fork 32 so that a rising and falling movement is imparted to the bar 35.

Secured to the lower end of the feed bar 35, is a hinged feeding foot 42 to which is imparted both a rising and falling movement and a to-and-fro movement. This feeding foot cooperates with a feed dog, to be described presently, to clamp the work for positive forward feed and to release the work for return of the feeding foot 42 during which time the work remains stationary in position for bonding.

Figure 5:
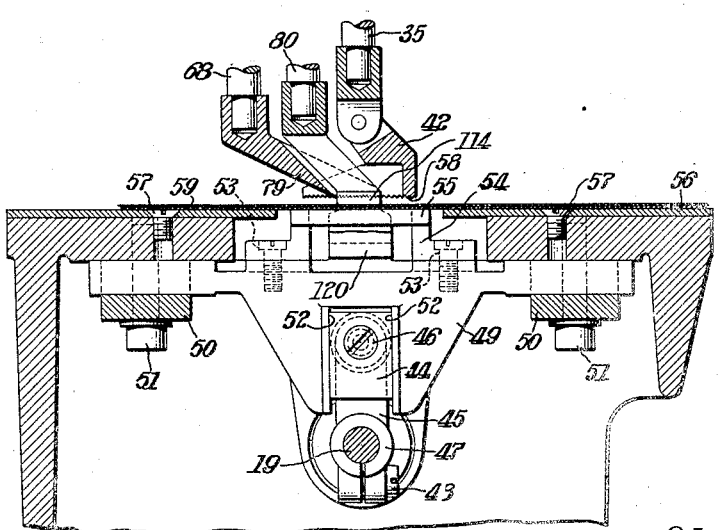
Fig. 5 is a vertical section, partly in elevation, taken on line 5—5 of Fig. 1.

As illustrated more particularly in Figs. 1 and 5, a slide block 44 is pivotally carried by a rock arm 45 by means of a pivot screw 46. The rock arm 45 is formed with a split hub portion 47 which embraces and is secured to the rock shaft 19 by means of a screw 48.

A cross-head 49 is slidably secured on bearing blocks 50—50 secured to the under side of the bed 1 by screws 51—51 and is given a linear to-and-fro motion by the slide block 44 which is disposed in a guideway 52—52 formed in the cross-head 49. Secured to the upper surface of said cross-head 49 by screws 53—53 is a feed-dog 54 formed with two spaced apart upstanding limbs, lying one on each side of the line of seam. Each limb terminates in a serrated portion 55—55 lying slightly above a work-supporting plate 56 secured to the bed 1 by screws 57—57. The feeding foot 42 has its lower portion bifurcated (see Fig. 8) to provide two spaced apart, serrated work-engaging surfaces 58—58 adapted to cooperate with the serrated portions 55—55 of the feed-dog 54 to progressively but intermittently feed work, represented by 59, through the machine.

The shaft 10 carries at one end a disc 59 formed with an eccentric pin 60 carrying a roller 61 which forms a lift cam for a presser member to be described presently. Two discs 62 and 63, are pivotally mounted eccentrically on a pin 64 secured to said pin 60. The discs are formed with slots 65 and 66, respectively, through which a screw 67 reaches to secure said discs 62 and 63 together and to the pin 60. As shown best in Fig. 7, the discs 62 and 63 provide, in effect, an adjustable eccentric as they may be brought together to form a surface concentric with that of the roller 61, or they may be spread apart to provide either earlier or later lift and release as may be desired. It is apparent that this adjustment is completely independent of the other lift eccentrics.

A presser bar 68 is journaled for vertical reciprocation in bearings 69, 70 and 71 in the head 4. A lift-lever 72 is pivotally secured to a rock-arm 73 by means of a cap screw 74, and the rock-arm 73 is, in turn, pivotally mounted on the head by means of a cap screw 75. At a point intermediate the ends thereof, the lift-lever 72 is pivotally connected to a split yoke 76 which surrounds and is secured to the presser bar 68 by means of a screw 77. The lift lever 72 is formed at its free end, with an upstanding portion 78 which terminates in a portion which overlies and presents a flat bearing surface 85 to the lift cam 61. As thus constructed, it is evident that, as the cam 61 turns, it will periodically lift one end of the lever 72, which lift is imparted to the presser bar 68 to cause a presser foot 79, secured to the lower end thereof, to be periodically raised out of pressure contact with the work 59. The presser foot 79 is bifurcated to provide, at its work-engaging end, two spaced limbs each positioned symmetrically on opposite sides of the seam line as shown best in Fig. 8.

Figure 3:
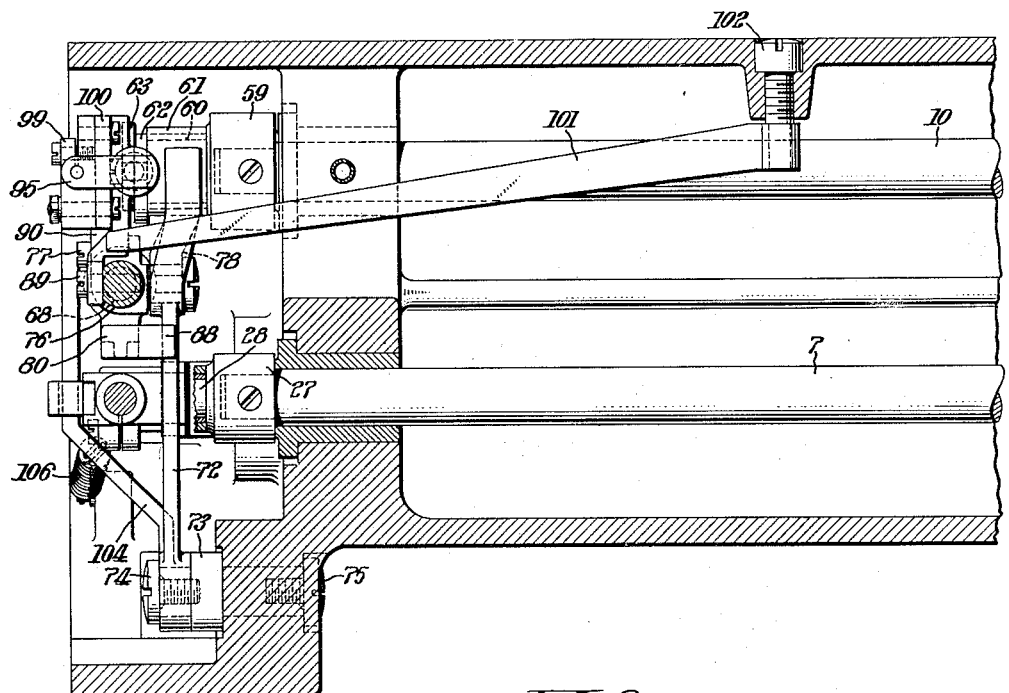
Fig. 3 is a horizontal section taken on the line 3—3 of Fig. 2.

An electrode bar 80 is formed with lateral arm portions 81, 82 and 121 in which are bearings 83, 84 and 122, respectively, which structure, embracing the presser-bar 68, supports said electrode bar for vertical reciprocation parallel to said presser bar 68. To prevent the electrode bar 80 from swinging sidewise about the presser-bar 68, the lateral arm portion 82 of said electrode bar has its free end 123 constrained to move vertically within a guideway formed between a portion 124 of the head 4 and a finger 125 secured to said head by means of a screw 126. The electrode bar 80 is biased downwardly by means of a compression spring 85 which embraces the presser-bar 68 and bears against the upper surface of the arm portion 82. The upper end of the spring 85 engages an offset stop member 86 which is adjustably secured to the head 4 by means of a screw 87. The upper end of the electrode bar 80 is formed to provide a cross-bar 88 which overhangs the lever 72, so that the lift of said lever imparts a lift to the electrode bar, as most clearly shown in Fig. 3.

Adjustably secured to the upper end of the presser-bar 68 by means of screws 89—89 is a switch bracket 90 which is formed with an upstanding cylindrical portion 91 containing a piston 92 which is free to reciprocate within the bore of the bracket-portion 91. The piston 92 is formed with a hardened stud 93 which is wiped by the discs 62 and 63 to lift said piston during certain portions of the revolution of the shaft 10. A rod 94 connects the piston 92 with an arm 95 to one end of which is adjustably secured an electrical contact 96. A compression spring 97 surrounds the rod 94 and biases the piston 92 downwardly so that the contact 96 is normally in contact with a second contact 98, except when the piston is lifted by the action of the cam discs 62 and 63. The contact 98 is adjustably secured to a conducting block 99 which is secured to an insulation block 100 which, in turn, is carried by the switch bracket 90. It will be seen that this switch structure provides a variable time for its open and closed condition, depending on the free position of the stud 93 relative to the axis of shaft 10, which is determined by the position of the presser bar 68 as determined by the thickness of the work 59. Thus, in general, for thicker work, the presser bar will be elevated to a higher position and the cam discs 62 and 63 will remain in contact with the stud 93 for a shorter length of time which means that the switch will remain open for a shorter time or, conversely, the switch will be closed for a longer time. This switch operates to turn on and off an oscillator in the same manner as described and set forth in the aforesaid copending application Serial No. 47,356. Reference to this application may be made for a complete understanding of the specific connections of the switch contacts with the oscillator elements.

Figure 2:
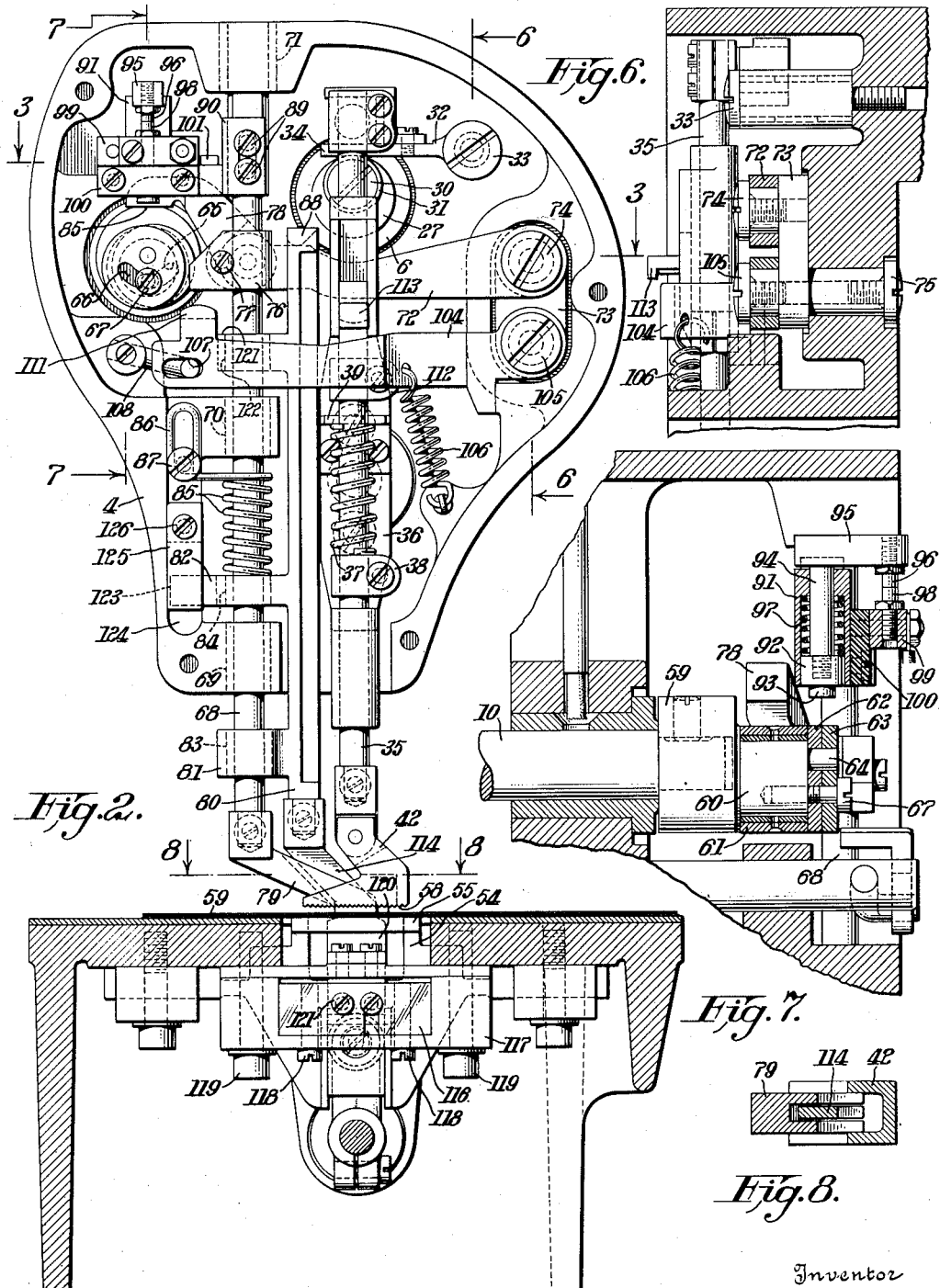
Fig. 2 is an enlarged front end elevation, partly in section, showing the head of the machine of Fig. 1 with the cover-plate removed.

In order to apply a downward biasing force to the presser bar 68, a leaf spring 101 has one end pivoted on a screw 102 threaded into the arm 3, while the opposite end bears upon the switch bracket 90 as shown best in Fig. 2. An adjusting screw 103 is threaded in the arm 3, contacts the spring 101 at a point intermediate the ends thereof, and provides means for adjusting the pressure exerted on the presser bar.

For manually lifting the feed-bar, electrode-bar and presser-bar to insert or remove work, a lift bar 104 is pivotally secured to the head 4 by means of a screw 105 and is biased downwardly by means of a spring 106 anchored in the head. The opposite end of the bar 104 is formed with a slot 107 which is engaged by a crank 108 secured to one end of a shaft 109 journaled in the arm 3. Secured to the shaft 109 adjacent the opposite end is a lever arm 110 (Fig. 4) adapted to receive connections to the customary manually operated lifter devices.

When the bar 104 is lifted, a vertically extended end-portion 111 thereof engages the lever 72 and lifts the presser bar 68 and also the electrode bar 80 through the agency of lever 72 and cross-bar 88. A split collar 112 is secured to the feed bar 35 and is formed with an overhanging portion 113 which is engaged by the lever 104 for imparting a lift to said feed bar.

An electrode 114 is secured to the lower end of the electrode bar 80 and cooperates with a lower stationary electrode 115 secured to an insulating block 116, which block is secured to a bracket 117 by means of screws 118—118. The bracket 117 is secured to the under side of the bed by means of screws 119—119. Also secured to the bracket 117 are two angle pieces 120—120 each of which has an upstanding portion which reaches through an aperture in the work-supporting plate 56 on either side of the electrode 115 and presents a cooperating surface to the corresponding limb of the presser foot 79 as best seen in Fig. 1.

It will be observed, from the above construction, that the upper electrode 114 is connected to the machine frame and thus forms the grounded side of the oscillator output circuit while the lower electrode is insulated from the machine frame and forms the "hot" side of the oscillator output circuit.

It will be understood that any suitable oscillator and load tuning circuit may be used with this machine which latter may, for example, be the same as that shown and described in the aforesaid patent application Serial No. 47,356 to which reference may be had for a more complete understanding. It is sufficient to note here that connection to the load tuning circuit is made to a screw 121 connected to the lower electrode 115.

The electrode 114 is disposed between the furcations of the presser-foot 79 which, in turn, is disposed between the furcations of the feeding foot 42 as illustrated in Fig. 8. In this manner, the presser bar and the feed bar exert their pressures upon unbonded areas of the work and do not interfere in any way with the material at the seam line. This insures that the extrusion of the material at the seam is controlled solely by the electrode which may be adjusted to hold the extrusion within close limits. It also insures that the feeding traction is applied to the work symmetrically with respect to the seam line and in areas not softened by the action of the radio-frequency field.

In operation, the work 59 is clamped between the feeding foot 42 and the feed-dog 54 and is carried forward intermittently. At the end of each feeding stroke, the feeding foot 42 is lifted from the work, the presser foot 79 descends and clamps the work in a stationary condition between said foot 79 and the angle pieces 120—120, during which condition the electrode 114 descends onto the work. Shortly after the electrode 114 engages the work, the switch-contacts 96 and 98 close and turn on the oscillator to apply a radio-frequency field in the work between the electrodes, and bonding actually begins. Just before the electrode 114 rises from the work 59, the switch-contacts open to remove the radio-frequency field, and terminates the bonding. The presser foot lifts and, with it, the electrode. During this bonding period, the feeding foot has returned to its initial position and is ready to begin another feeding stroke. One complete cycle of feeding and bonding, corresponding to one complete revolution of the shaft 7, has been completed.

It will be observed that the electrode bar 80 is limited in its descent to the amount permitted by the lever 72 which, in turn, is controlled by the presser bar 68 in accordance with its response to the thickness of the work materials. That is to say, the maximum penetration of the electrode 114 into the work is made to depend on the thickness of the work, as determined by the presser foot.

The operation of the oscillator switch is also dependent on the work thickness as determined by the presser foot and transmitted to the switch by the presser bar 68. A novel feature of this construction resides in the adjustability of the lift eccentric for the switch. By forming the lifting cam surface for the switch from two independently adjustable discs 62 and 63, the closure of the contacts 96 and 98 may be delayed until after the electrode 114 is in contact with the work 59 on the descending stroke of the electrode. Likewise, the opening of the contacts 96 and 98 may be advanced to occur before the electrode begins its ascent. With these two independent adjustments, the maximum bonding time per cycle is secured consistent with the criterion for no sparking, viz, that no air gaps are formed while the radio-frequency field is effective.

The actual advance of the material in each feeding stroke and therefore the number of bonds per inch may be controlled by the setting of the adjustable eccentric 15, which determines the extent of the oscillation of the rockshaft 19 and the shaft 22.

Having thus set forth the nature of the invention, what I claim herein is:

1. A machine for sealing together plies of dielectric material by the application thereto of a radio-frequency field, comprising clamp means for imparting intermittent feeding movements to said material, presser means for holding said material stationary at the end of each feeding movement, electrode means for providing pressure to said material during its stationary condition, a source of radio-frequency energy connected to said electrode means to provide a radio-frequency field for said material, switch means for controlling the application and removal of said radio-frequency energy to said electrode means in timed relation to the application and removal of pressure to said material by said electrode means, cam means for adjusting the time of application of the radio-frequency field relative to the application of said pressure, and independent cam means for adjusting the time of removal of the radio-frequency field relative to the removal of said pressure.

2. A machine for forming continuous sealed seams in superposed plies of dielectric material by the application thereto of a radio-frequency field, comprising opposed feeding elements for imparting intermittent advance movements to said superposed plies, reciprocatory presser means for holding said plies stationary at the end of each advance movement thereof, electrode means for applying pressure to said plies during said stationary condition, a source of radio-frequency energy adapted to be connected to said electrode means for establishing in said plies a radio-frequency field, switch means for controlling the application and removal of said radio-frequency energy to said electrode means in timed relation to the application and removal of pressure to said plies by said electrode means, cam means for adjusting the time of application of the radio-frequency field relative to the application of said pressure, and independent cam means for adjusting the time of removal of the radio-frequency field relative to the removal of said pressure.

3. In a machine for forming a continuous seal between plies of dielectric material by the intermittent application thereto of a radio-frequency field, in combination, upper and lower feeding elements cooperating to clamp said plies therebetween and to impart thereto intermittent forward feeding movements, a first lift eccentric operatively connected to said upper feeding element, a presser element for holding the plies stationary for an interval between each of said feeding movements, upper and lower electrode elements for applying pressure to said plies while they are held stationary by said presser element, a second lift eccentric operatively connected to said presser element and to said upper electrode, a source of radio-frequency energy connected to said electrodes to establish an electric field therebetween, a switch mechanism carried by said presser element to selectively render said field effective and ineffective, and a third lift eccentric operatively connected to said switch.

4. Apparatus as set forth in claim 3, in which the second and third lift eccentrics are secured to a common shaft.

5. Apparatus as set forth in claim 3, in which the third lift eccentric comprises two stacked discs each mounted for limited independent adjustment about a common crank-pin.

6. In a machine for making continuous seals in plies of dielectric material by the application thereto of a radio-frequency field, in combination, an upper feeding element comprising an oscillating frame, a feed bar journaled for generally vertical reciprocatory movement in said frame, a lift eccentric for intermittently lifting said feed bar, a spring for providing a downward bias on said feed bar, and a hinged feeding foot secured to said feed bar, a lower feeding element comprising a feed-dog mounted for horizontal reciprocatory movement and a rock arm connected to said feed-dog for imparting said movement, said upper and lower feeding elements cooperating to intermittently clamp said plies therebetween and impart thereto a forward feeding movement, an upper electrode arranged to be reciprocated into and out of contact with said plies, a stationary lower electrode positioned below the plies and opposed to said upper electrode, upper and lower presser elements for engaging said plies during the time said upper and lower electrodes are in contact therewith, and a source of radio-frequency energy connected to said electrodes for establishing in said plies an electric field, said feeding foot and said feed-dog being shaped and positioned to clamp said plies symmetrically on both sides of a central area contacted by the electrodes.

7. In a machine for sealing together plies of dielectric material by the application thereto of a radio-frequency field, in combination, means for imparting intermittent feeding movements to said material, means for holding said material stationary for a period between each of said feeding movements, electrode means for applying pressure to and removing pressure from said plies during said stationary periods, means including said electrode means for applying a radio-frequency field to and removing said radio-frequency field from said plies in the region of the pressure application during each of said stationary periods, adjustable cam means for controlling the time of application of the pressure relative to the application of the radio-frequency field, and independently adjustable cam means for controlling the time of removal of the pressure relative to the removal of the radio-frequency field in each of said stationary periods.

HANS HACKLANDER.

(References on following page)

REFERENCES CITED

The following references are of record in the file of this patent:

UNITED STATES PATENTS

| Number | Name | Date |
|---|---|---|
| 2,432,412 | Hacklander | Dec. 9, 1947 |
| 2,477,040 | Brown et al. | July 26, 1949 |
| 2,494,888 | Vesconte et al. | Jan. 17, 1950 |
| 2,504,754 | Sweeny | Apr. 18, 1950 |
| 2,506,325 | Ackerman | May 2, 1950 |
| 2,509,595 | Hacklander | May 30, 1950 |
| 2,534,593 | Hacklander et al. | Dec. 19, 1950 |
| 2,539,375 | Snyder | Jan. 23, 1951 |

FOREIGN PATENTS

| Number | Country | Date |
|---|---|---|
| 599,298 | Great Britain | Mar. 9, 1948 |
| 613,419 | Great Britain | Nov. 29, 1948 |